United States Patent [19]

Suzuki

[11] 4,176,151

[45] Nov. 27, 1979

[54] METHOD FOR MANUFACTURING AN ARTICLE STOPPER DEVICE

[75] Inventor: Tadashi Suzuki, Kita-Adachi, Japan

[73] Assignee: Sato Gosei Co., Ltd., Tokyo, Japan

[21] Appl. No.: 865,920

[22] Filed: Dec. 30, 1977

[30] Foreign Application Priority Data

Jul. 22, 1977 [JP] Japan ............................. 52-87466
Oct. 29, 1977 [JP] Japan ............................. 52-130169

[51] Int. Cl.² .................................................. B29C 17/02
[52] U.S. Cl. .................................... 264/291; 264/334; 425/383
[58] Field of Search .............. 264/291, 334, 297, 328, 264/329; 24/150 FP; 425/383, 805, DIG. 53, DIG. 236

[56] References Cited

U.S. PATENT DOCUMENTS

| | | | |
|---|---|---|---|
| 2,355,744 | 8/1944 | Myers | 425/805 |
| 3,380,122 | 4/1968 | Kirk | 264/291 |
| 3,444,597 | 5/1969 | Bone | 24/150 FP |
| 3,624,670 | 2/1971 | Gordon | 264/291 |
| 3,781,402 | 12/1973 | Hanggi et al. | 264/291 |

*Primary Examiner*—James B. Lowe
*Attorney, Agent, or Firm*—Armstrong, Nikaido, Marmelstein & Kubovcik

[57] ABSTRACT

A method is provided for stretching and releasing from a mold an integrally molded thermoplastic resin stopper device. The stopper device has a filament portion, a head portion on one end of said filament portion and a crossbar portion on the other end of the filament portion. The head portion has an end part side faces and an end face. The mold includes a first mold means surrounding the crossbar portion of the stopper device, a second mold means surrounding the filament portion and end phase of the head portion of the stopper device, and a third mold means surrounding the side faces and end part of the head portion. The third mold means has separable upper and lower mold portions. The method of stretching and releasing the stopper device from the mold comprises separating the second and third mold means by moving at least one of the second and third mold means away from the other in a direction along the axis of the filament portion of the stopper device, with the side faces and end part of the head being adhered to the third mold means, such that the filament is stretched in its axial direction. The movement of one of the upper and lower portions of the third mold means is stopped and the movement of the other is continued, thereby separating the side faces and end part of the head portion from the one of the upper or lower portions of the third mold means which is moved. The stopper device is then separated from the other of the upper and lower portions of the third mold means and from the first and second mold means, thereby releasing the stopper device from the mold.

3 Claims, 13 Drawing Figures

METHOD FOR MANUFACTURING AN ARTICLE STOPPER DEVICE

BACKGROUND OF THE INVENTION

The present invention relates to a method and apparatus for manufacturing article stoppers known also as tag pins, for attaching such as labels or tags to merchandise or connecting together a plurality of articles.

Figure 1:
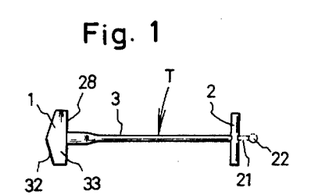
FIG. 1 is a plan view, showing an article stopper device according to the present invention.
Figure 2:
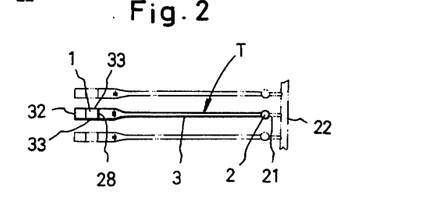
FIG. 2 is a side elevation view showing the stopper device of FIG. 1.

With the stopper devices to which the present invention most broadly relates and which are generically represented by letter T in the accompanying drawings, those today most widely utilized have individually a generally H-shaped overall structure as shown in FIGS. 1 and 2 of the accompanying drawings, which individually comprise a head portion 1, a crossbar member 2 and a filament portion 3 connecting between the same, which are integrally formed by molding a synthetic resin capable of undergoing molecular orientation, such as nylon and so forth.

The stoppers having the above structure are required to have the filament portion stretched as thin as possible so as not to seriously impair the article through which the stopper is applied and yet rigid enough to permit the crossbar member to restore its original condition as soon as it has been applied through an article by an attacher device.

For satisfying the above requirements, the sectional area of the filament portion 3 is reduced by stretching, and end part of the filament at which the filament is connected to the crossbar or lateral rod member is especially made fine but tough and flexible by molecular orientation. The fact that the filament portion is tough and flexible means that when it is pierced through an article, the lateral rod or crossbar 2 can immediately restore its original condition (in a T-letter relation to the filament portion). Accordingly, whether the filament portion 3 is appropriately stretched or not assumes an extreme importance in having the quality of the stopper device determined.

As apparatus for stretching the article stopper device T, there can be mentioned an apparatus which utilizes molds per se and also an apparatus in which a blank stopper is once taken out of the mold and is then stretched. Apparatus of the former type is proposed and disclosed in, for example, Japanese Patent Publication No. 46-37100. In this known apparatus, the mold for manufacturing the stopper device is arranged so that the head portion and the lateral rod are moved relative to each other in the lengthwise directions of the filament. More specifically, a blank of the stopper product is formed, and one or both of the mold parts by which the head portion and crossbar are formed respectively are moved in the direction or directions apart from each other while the blank stopper is received in the mold, to thereby have the filament portion stretched a predetermined length. In other words, in this known technique both the molding of the blank of a product stopper and stretching of the filament portion are performed by utilizing the same molds, and this known method is advantageous in that it can provide a molded article having a fine structure and that a high productivity is obtainable because it can perform the stretching operation without the need of once taking the stopper blank out of molds.

In the mold for use in practising the known method under consideration, portions are formed where the lateral rod or crossbar and the head portion confront each other (called "butting portion") and while the head portion and the crossbar are hung on these butting portions of the mold, both the crossbar and the head portion are moved relatively so that they are separated from each other, whereby the filament portion is stretched.

Whereas in the Patent Publication above referred to specific movements of mold members are recited with reference to illustrations in FIGS. 6 to 9, according to the disclosure in the Publication a pin for parting the crossbar member and the head portion from each other should necessarily be built in the cavity of the mold and when the molded stopper product is parted from the mold, both the end faces of the stopper with respect to the widthwise direction should be pressed by this pin.

As well known in the art, sizes of now commercially available stopper devices are very small, and in general, the diameter of the crossbar is about 0.7 to about 1.0 mm and the thickness of the head portion is about 0.6 to about 1.0 mm. In order to withdraw such fine crossbar or lateral rod or head portion from the mold, a put-out or push-out pin should have a size equal to or smaller than the above-mentioned size of the crossbar or head portion.

Accordingly, the structure of the mold is complicated and the put-out pin or the like is readily worn or damaged. Further, a space should be formed between the mold and the put-out pin for operating this put-out pin. However, if there is a space exceeding 2/100 mm between the mold and the pin, a flash is formed about the crossbar or lateral rod, or the head portion, and if this space is larger than 5/100 mm, a considerably large flash is formed. The presence of such flash is not allowed at all in the stopper device because an article to which the device is attached, especially a garment or the like, is readily damaged by catching of the device on fibers or the like. Namely, this defect is conspicuous in case of fibrous articles, garments and the like. Moreover, this put-out or push-out pin, that is reciprocated in the mold at a high speed at every cycle of molding, involves various problems. For example, the pin is sintered while the molding operation is repeated and peeling is caused between the pin and the mold. Further, the pin per se is bent or in an extreme case, the pin is broken.

Through experience it has been found that a synthetic resin readily adheres to the mold just after molding and the molded synthetic resin is hardly pushed out or put out by the use of a put-out or push-out pin such as mentioned above just after molding. Namely, in many cases, the put-out pin is intruded into the head portion or the lateral rod or crossbar to damage a molded product. Furthermore, when such put-out pin is used repeatedly, the put-out end thereof is roughened and in this state, the crossbar or head portion of the stopper device to be put out adheres to the roughened end of the pin and the parting property of the molded product is reduced. Therefore, when all the spare pins are exchanged, the mold per se should be replaced by a new one.

Figure 3:
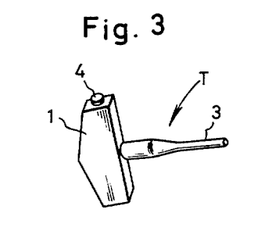
FIGS. 3 to 6 are perspective views, illustrating defects appearing on head portions of article stoppers obtained according to conventional methods and apparatus.
Figure 4:
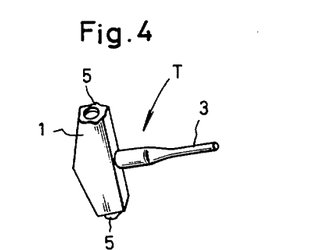

FIG. 3 is a perspective view, illustrating the state where a projecting flash 4 is formed on the side end of head portion 1. In this case, the outer periphery of the head portion 1 comes to have an irregular configuration and the commercial value of the stopper device is degraded. The flash is not highly damaging because it does not catch on a garment or the like. However, if there is formed a clearance or space in the joint portion between mold parts, a petal-like flash 5 as shown in FIG. 4 is projected from the head portion 1. Such thin petal-like flash 5 readily catches on a garment or the like and tends to damage an article. Therefore, article stoppers having a flash of this kind are usually discarded as defective products.

Figure 5:
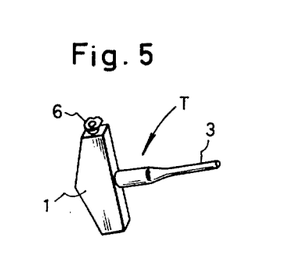

FIG. 5 illustrates a product stopper device having projected petal-like flash 6 corresponding to a combination of flashes shown in FIGS. 3 and 4. The flash 6 of this type is characterized in that the portion corresponding to the petal is relatively small in size.

Figure 6:
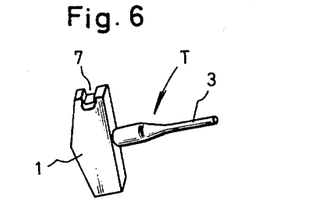

When a resin is injected into the cavity of a mold under a high pressure, the high pressure is naturally imposed on the article being molded and it is permitted to undergo expansion. Accordingly, even if it is intended to put out the molded article by means of a pin, the molded article tightly adheres to the cavity of the mold and it cannot be shifted with ease. Moreover, the molded article is still in the softened state. Accordingly, if it is intended to put out the molded article forcibly, the projecting pin is caused to sink into the head portion and dent 7 is formed as shown in FIG. 6.

The force for withdrawing the molded article from the mold corresponds to the sum of the force of adherence of the molded article to the mold, the pressing force of the molded article expanded by the molding pressure to the wall of the cavity of the mold, and the like. In order to resist this force, the put-out pin should have a size of at least 1 mm. If the put-out pin is made thick, there is brought about a problem that the thickness of the head portion is proportionally increased. The head portion occupies the majority of the synthetic resin constituting the stopper device. Accordingly, reduction of the quantity of the synthetic resin occupied by the head portion is significant from an economical viewpoint and is important for reducing the size of the mold (in many cases, it becomes unnecessary to inject the resin under a high pressure). However, in the conventional apparatus for production of article stopper device, since a put-out pin as mentioned before should inevitably be used, reduction of the thickness is limited by provision of the put-out pin and it is impossible to decrease the thickness of the head portion.

SUMMARY OF THE INVENTION

The present Inventor has made research works with a view to solving the above-mentioned fundamental problems involved in the conventional technique as disclosed in Japanese Patent Publication No. 46-37100, and as a result, has succeeded in developing an apparatus for producing stopper devices in which the head portion of the devices can be smoothly parted from molds in good conditions.

The basic principle of the present invention is different from that of the technique disclosed in Japanese Patent Publication No. 46-37100 in the point that stretching of the filament portion is not effected in the state where the entire of the head portion is embedded in the cavity but is effected by utilizing the force of adherence of the top end part and both side faces of the head portion, except the side end portion connected to the filament portion, to the mold.

According to the present invention, the filament portion is stretched by utilizing the force of the synthetic resin adhering to the mold, and by moving relatively the upper and lower parts of the mold, a half of the head portion is first parted from the cavity of the mold and the remaining part of the head portion is then pushed out.

That is to say, the top end part and both side faces of the head portion and the lateral rod or crossbar portion are not parted at a time completely, but they are partially parted at first by moving the mold parts relatively.

When the molded stopper device is finally separated from the mold, the resisting force between the mold and molded artilce is minimized and the molded device is smoothly withdrawn from the mold.

Further, a push-out member is not exposed to the mold cavity portions for the head portion and crossbar but separated by a certain distance therefrom so that the push-out member does not fall in contact with the head portion or lateral rod or bar during molding or the molded device is parted from the mold.

Especially, in the present invention, of the mold cavity portion for the head portion, a part facing the crossbar or lateral rod is kept opened and in this state, the filament portion is stretched. Accordingly, stretching of the filament portion is performed in the state where the head portion adheres to the interior of the cavity.

In the present invention, operations of these mold parts can be accomplished by an operating mechanism for separating a mold part attached to the fixed side of the molding machine and a mold part attached to the moving side of the molding machine from each other.

It is a primary object of the present invention to provide an apparatus for manufacturing article stopper devices, in which direct contact of a pin for putting out the head portion with said head portion, which is observed in the conventional apparatus, is prevented and hence, formation of flashes or deformation of the molded stopper device can be effectively prevented.

Another object of the present invention is to provide an apparatus for manufacturing stopper devices, in which on stretching of the filament portion, a part of the molded device is separated from the mold and the remaining part of the device is partially separated from the mold, thereby to enhance the efficiency of parting of the molded product from the mold, and this effect is further improved by setting and contraction of the device-constituting resin material after the molding operation.

Still another object of the present invention is to provide an apparatus for preparing stopper devices, in which respective parts of the mold are operated by closing and opening the mold parts by a molding machine without using such a power source as a cylinder or a motor.

DETAILED DESCRIPTION OF THE PREFERRED EMBODIMENT

Figure 7:
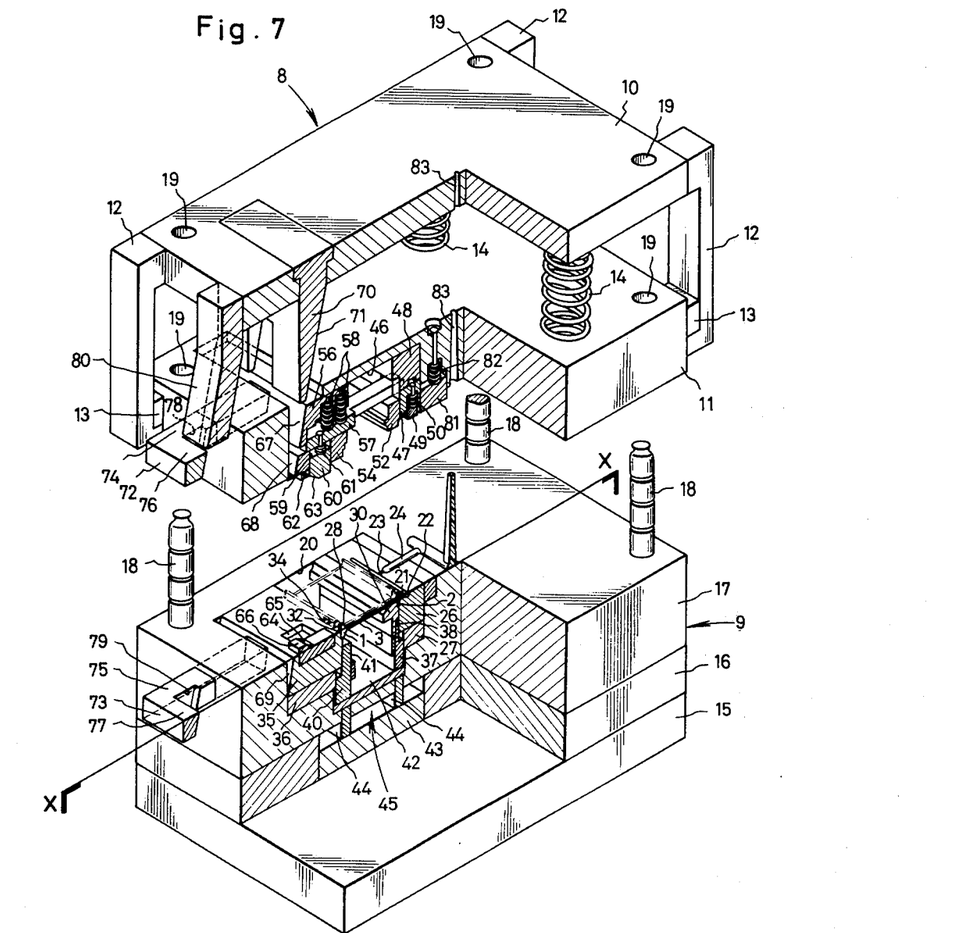
FIG. 7 is a perspective view, illustrating partly in section the entire structure of the apparatus for producing stopper devices according to the present invention.

Referring to FIG. 7, a fixed mold member 8 is attached to an attachment portion of an injection molding machine (not shown) on the fixed side thereof and a moving mold member 9 is attached to an attaching portion of the injection molding machine on the moving side.

A fixed mold supporting plate 11 is disposed to face a fixed mold attaching plate 10 fixed to the mold attaching portion on the fixed side of the injection molding machine, and this fixed mold supporting plate 11 and the fixed mold 10 are positioned by guides 12 attached to four corners of the fixed mold attaching plate 10. A dent is formed on the inner face of each of these guides 12, so that a stopper 13 attached to the face of the fixed mold supporting plate 11 on the side confronting the guide 12 is allowed to slide in the above-mentioned dent of the guide 12. A compression coil spring 14 is laid out in the contracted state between the fixed mold attaching plate 10 and the fixed mold supporting plate 11, and the fixed mold supporting plate 11 is urged in a direction separating from the fixed mold attaching plate 10 by the spring 14.

For the moving of mold 9, a moving mold supporting plate 17 is fixed to a moving mold attaching plate 15 attached to the moving mold attaching portion of the injection molding machine through an intermediate plate 16.

On four corners of the face of the moving mold supporting plate 17 on the side confronting the fixed mold supporting plate 11, stanchions 18 are erected so that they are allowed to slide in guide holes 19 formed on the fixed mold supporting plate 11 and fixed mold attaching plate 10.

Accordingly, even if the fixed mold 8 and moving mold 9 are slid, they are positioned in both the lateral and longitudinal directions by these stanchions 18 and guide holes 19.

Figure 8:
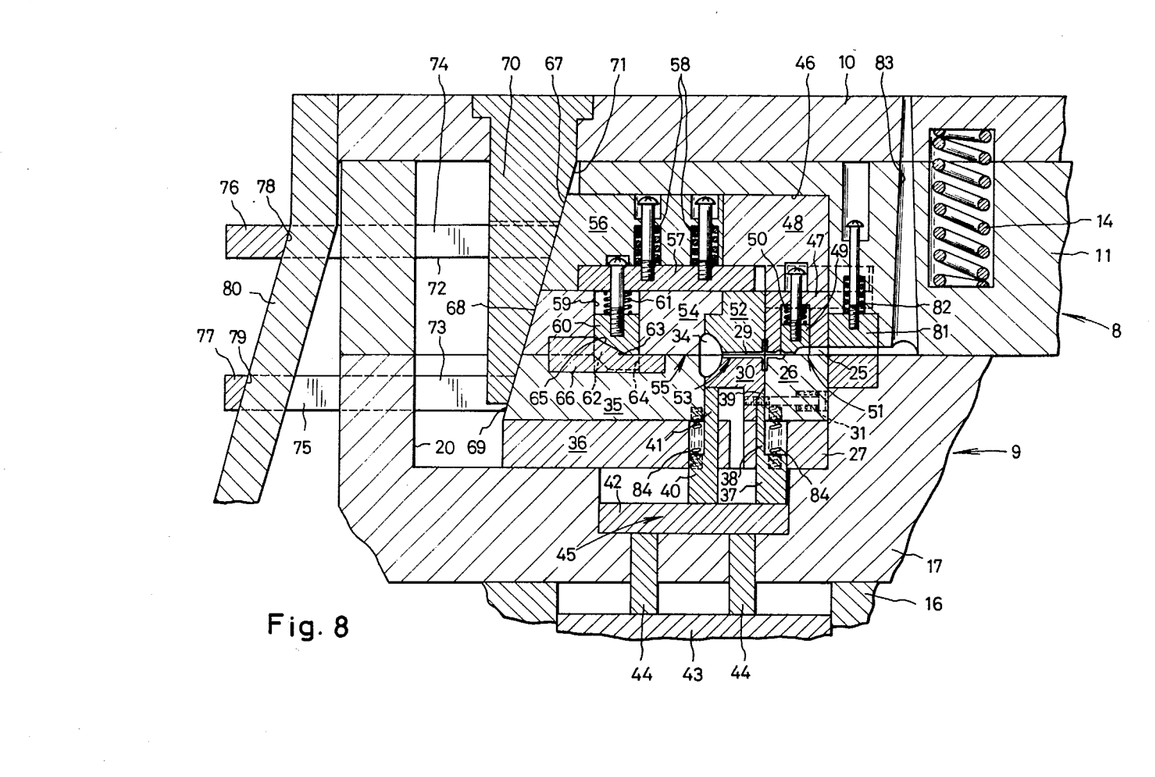
FIGS. 8 to 12 are views, showing the section taken along the line X—X of FIG. 7, which illustrates the operations of the apparatus according to the present invention.

In the so arranged fixed mold 8 and moving mold 9, on the face of the supporting plate 17 for the moving mold 9 on the side confronting the fixed mold supporting plate 11, there is formed a bottomed hole 20 as shown in FIG. 8, and in this bottomed hole 20, there is fixed a first lower mold 26 defining the lower half of a cavity 25 with respect to the axial line of the stopper device T (FIG. 8), together with a push-out member fixing plate 27 disposed below, said cavity 25 being for forming the right half of the crossbar or lateral rod 2 of the stopper device T with respect to the axial line thereof (FIG. 8), connecting piece 21 and connecting rod 22 constituting a connecting portion and a part of the bottom of melt opening 23 and melt path 24.

Next to the first lower mold 26 on the left side thereof (FIG. 8), there is disposed a second lower mold 30 defining a lower half (FIG. 8) with respect to the axial line of the stopper device T, of a cavity 29 for forming the left half of the lateral rod 2 of the device T with respect to the axial line thereof (FIG. 8), filament portion 3 and a side end face 28 of head portion 1 confronting the filament portion (FIG. 1). This second lower mold 30 is always urged toward the lower mold 26 by an elastic force of a spring 31.

Next to the second lower mold 30 on the left side thereof (FIG. 8), there is disposed a third lower mold 35 defining a lower half, with respect to the axial line of the article stopper T, of a cavity 34 for forming the top end part 32 of the head portion of the stopper or tag pin T and both side faces thereof.

This third lower mold 35 is fixed to a push-up member moving and supporting plate 36 disposed below the third lower mold 35, and the mold 35 and plate 36 are arranged so that they can slidably move in the above-mentioned bottomed hole 20.

The top end 38 of a push-up member 37 sliding in the push-out member fixing and supporting plate 27 is exposed between the first lower mold 26 and second lower mold 30 at a position slightly separated from the cavities 25 and 29 of these molds. An inclined part 39 is formed on the tip of the top end 38 of the push-out member 37 so that with vertical movement of the push-out member 37, the second lower mold 30 is moved to the left (FIG. 12) to expose the top end 38 to the cavities 25 and 29.

Figure 10:
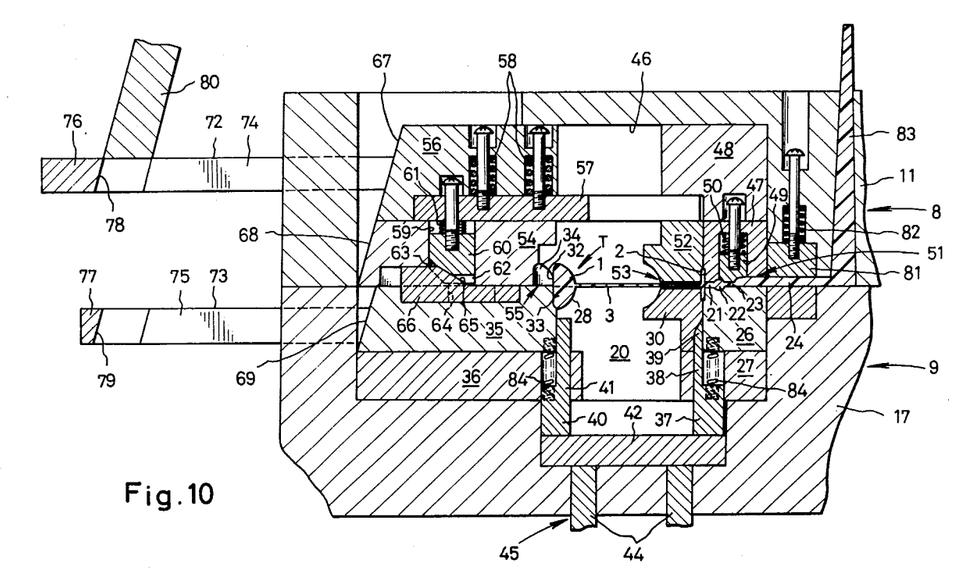

The top end 41 of a push-up member 40 sliding in the push-out member moving and supporting plate 36 is located below the cavity 29 of the second lower mold 30 at a point slightly separated therefrom as shown in FIG. 8 when the article stopper or tag pin T is formed by injection molding. When the third lower mold 35 is moved to the left as shown in FIG. 10 by the operation described hereinafter, also the push-up member 40 is moved with the movement of the third lower mold 35 to push out the head portion 1 of the tag pin T.

These push-up members 37 and 40 are located on a push-up bottom plate 42 arranged so that the bottom plate 42 can move in the vertical direction in the moving mold supporting plate 17 and at least the left push-up member 40 in FIG. 8 can slide on the push-up bottom plate 42.

A push-up connecting plate 44 is interposed between the push-up bottom plate 42 and a push-up plate 43 sliding in the intermediate plate 16, and a push-up mechanism 45 is constructed so that when the moving mold 9 retreats together with the moving mold attaching portion of the injection molding machine and the mold is opened, the push-up members 37 and 40 are operated by a push-out rod (not shown) disposed in the injection molding machine.

On the face of the mold supportng plate 11 of the fixed mold 8 on the side confronting the moving mold supporting plate 17, a partially piercing bottomed hole 46 is formed as shown in FIG. 8, and a first upper mold 47 defining an upper half (FIG. 8), with respect to the axial line of the tag pin product T, of the cavity 25 for forming the right half (FIG. 8) of the lateral rod or crossbar 2 of the stopper device T with respect to the axial line thereof, the connecting piece 21 and connecting rod 22 and a part of the bottom of the melt opening 23 and melt path 24, is fixed to a fixing plate 48 fixed and disposed in the bottomed hole 46 located above the first upper mold 47.

A first pressing mold 49 defining a cavity for forming about ¼ of the connecting rod 22 and parts of the melt opening 23 and melt path 24 is slidably fitted in the first upper mold 47. This first pressing mold 49 is urged downwardly by a spring 50 having a force larger than the force imposed on the pressing mold 49 by the injection pressure.

By registering the first upper mold 47 with the first lower mold 26, a first mold 51 is formed.

Next to the first upper mold 47 on the left side (FIG. 8), there is disposed a second upper mold 52 defining the upper half (FIG. 8), with respect to the axial line of the stopper device T, of the cavity 29 for forming the left half of the crossbar or lateral rod 2 of the device T with respect to the axial line thereof, the filament portion 3 and the filament-facing side end face of the head portion 1. This second upper mold 52 is slidably held on the side face of the first upper mold 47.

When this second upper mold 52 is registered with the second lower mold 30, there is constructed a second mold 53.

Next to the second upper mold 52 on the left side (FIG. 8), there is disposed a third upper mold 54 defining the upper half (FIG. 8), with respect to the axial line of the tag pin or stopper device T, of the cavity 34 for forming the top end part 32 of the head portion 1 of the device T and both the side faces of the head portion 1.

When this third upper mold 54 is registered with the third lower mold 35, there is constructed a third mold 55.

A moving plate 56 capable of sliding in the horizontal direction in the bottomed hole 46 of the fixed mold supporting plate 11 is disposed above the third upper mold 54, and a mold hanging plate 57 is interposed between this moving plate 56 and the third upper mold 54. This mold hanging plate 57 is always urged downwardly in FIG. 8 by springs 58 disposed in the moving plate 56, and the third upper mold 54 is fixed to this mold hanging plate 57.

This mold hanging plate 57 also has bearing contact with the top face of the second upper mold 52, and when the moving mold 9 is separated from the fixed mold 8, by the urging force of the springs 58 on the mold hanging plate 27, the second upper mold 52 together with the first pressing mold 49 acts as the mechanism for the parting movement of the first mold 51 so that until the right upper portion of the crossbar member 2 of the article stopper T and the left upper portion of the connecting piece 21 and connecting rod 22 are separated from the mold, the other portions are pressed by the second upper mold 52 and first pressing mold 49.

A stop plate 60 sliding in a through hole 59 of the third upper mold 54 in the vertical direction is hung down in the mold hanging plate 57, and this stop plate 60 is always urged downwardly by means of a spring 61.

A gate-shaped groove 62 is formed in the lower portion of the stop plate 60 and an inclined face 63 is formed on the top surface of the groove 62. Namely, the stop plate 60 is arranged so that at the time of injection molding, the lower portion of the stop plate 60 is engaged with an anchoring groove 64 formed on the top surface of the third lower mold 35 to integrate the third upper mold 54 and third lower mold 35 with each other. At the center, with respect to the widthwise direction, of the anchoring groove 64 of the third lower mold 35, a stop plate cam 66 having an inclined face 65 on the top surface thereof is fixed, and the inclined face 65 of the stop plate cam 66 is arranged so that it is registered with the inclined face 63 of the groove 62 of the stop plate 60.

On the left side faces (FIG. 8) of the moving plate 56, third upper mold 54 and third lower mold 35, there are formed inclined faces 67, 68 and 69 having the same inclination angle so that they form one plane while the injection molding is conducted, and an inclined face 71 of a return cam 70 hanging down from the fixed mold attaching plate 10, the inclination angle of which is the same as the inclination angle of the inclined faces 67, 68 and 69, is formed to have bearing contact with these inclined faces 67, 68 and 69.

Slide plates 72 and 73 extending in the horizontal direction to the left in FIG. 8 are disposed on the inclined faces 67 and 69 of the moving plate 56 and third lower mold 35.

The intermediate portion of each of these slide plates 72 and 73 is slidably supported on the fixed mold supporting plate 11 or the moving mold supporting plate 17.

These slide plates 72 and 73 include two parallel longitudinal pieces 76 and 77 and lateral pieces 74 and 75 connecting the longitudinal pieces 76 and 77 outside the mold. Inclined grooves 78 and 79 having the same inclination angle as that of the return cam 70 are formed on the inner side faces of the longitudinal pieces 74 and 75, so that a stretching cam 80 inclined at the same inclination angle as that of the return cam 70 and extending from the fixed mold attaching plate 10 is slidably fitted in the grooves 78 and 79.

When the space between the fixed mold attaching plate 10 and the fixed mold supporting plate 11 is expanded by the action of the compression coil spring 14 disposed between the fixed mold attaching plate 10 and fixed mold supporting plate 11, the moving plate 56, third upper mold 54 and third lower mold 35 are simultaneously moved to the left in FIG. 8. Thus, the mechanism for the stretching movement of the third mold is constructed. When the space between the fixed mold attaching plate 10 and the fixed mold supporting plate 11 is further expanded, the stretching cam 80 is disengaged from the slide plate 73 of the moving mold 9 to stop the third lower mold 35 and as shown in FIG. 10, only the moving plate 56 and third upper mold 54 are moved to the left. Thus, the mechanism for the parting movement of the third upper mold 54 is constructed.

The parting movement of the second upper mold 52 is accomplished by separation of the moving mold from the fixed mold.

Referring to FIG. 8, a block 81 is mounted on the fixed mold supporting plate 11 to define a part of a cavity for forming the melt path 24 and is always urged downwardly by a spring 82. This block 81 is disposed so as to press the molded article when the molded article is separated from the first mold 51.

In the terminal end portion of the above cavity for forming the melt path 24, a melt path cavity 83 piercing the fixed mold supporting plate 11 and fixed mold attaching plate 10 is disposed to communicate said cavity for forming the melt path 24 with a nozzle of the molding machine.

The operation and effect of the apparatus of the present invention having the above structure will now be described.

The moving mold attaching portion of the injection molding machine (not shown) is shifted toward the fixed mold attaching portion of the molding machine, whereby the fixed mold 8 and moving mold 9 attached thereto are registered with each other as shown in FIG. 8. More specifically, the first lower mold 26, second lower mold 30 and third lower mold 35 are registered with the first upper mold 47, second upper mold 52 and third upper mold 54, respectively, and the cavity 25 of the first mold 51, the cavity 29 of the second mold 53 and the cavity 34 of the third mold 55 are communicated with one another to form a cavity having a shape of the stopper device T.

A melt of a thermoplastic resin material is injected under an appropriate pressure from a nozzle of the injection molding machine (not shown) into the mold cavities 25, 29 and 34 through the melt path cavity 83 and the melt opening 23.

After completion of injection of the melt, the moving plate 9 begins to separate from the fixed mold 8 together with the moving mold attaching portion of the injection molding machine. At this point, the quantity of the movement of the moving mold 9 is compensated by the compression coil spring 14 to keep the respective upper and lower molds in the tightly and adherently held state.

However, since the return cam 70 and stretching cam 80 attached to the fixed mold attaching plate 10 are not moved, the slide plates 72 and 73 are caused to slide on the stretching cam 80 and simultaneously, slips are generated between the inclined face 71 of the return cam 70 and the inclined faces 67, 68 and 69 of the moving plate 56, third upper mold 54 and third lower mold 37. As a result, the moving plate 56, third upper mold 54, third lower mold 35 and the push-out member supporting plate 36 fixed to the third mold 55 are instantaneously moved to the left.

Figure 9:
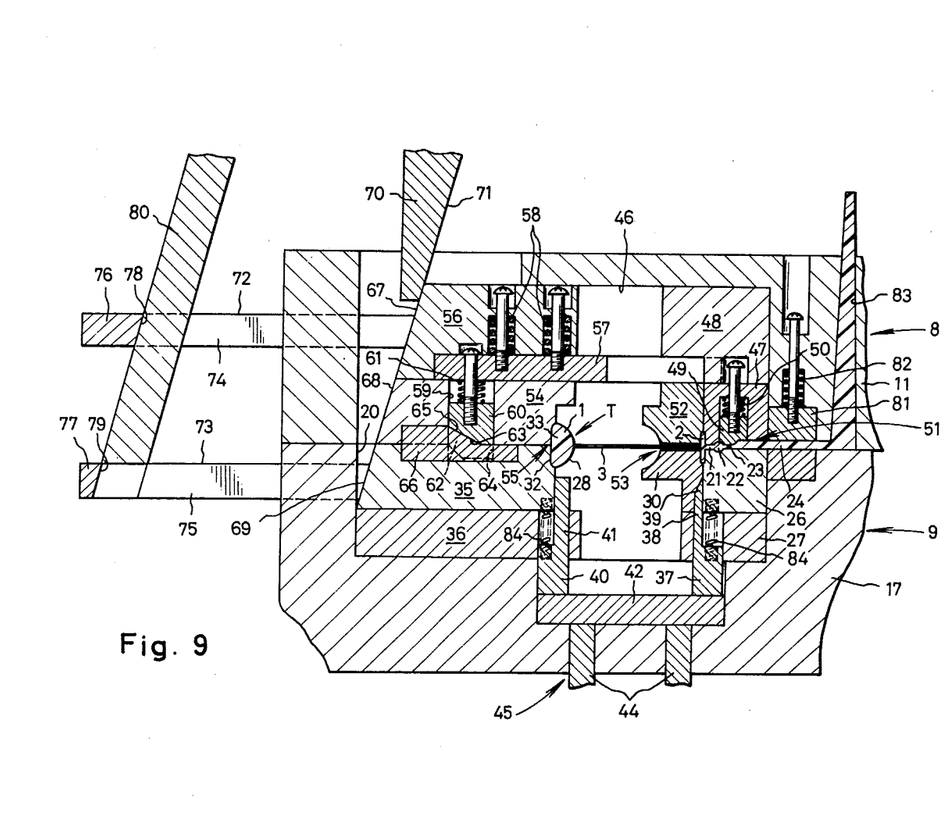

With this instantaneous movement, there is formed an adhering force between the molten material and the wall of the cavity 34 of the third mold 55 for forming the top end part 32 and both side faces 33 of the head portion 1 of the tag pin or stopper device T, and by this adhering force, the head portion of the stopper T is moved to the left in FIG. 9 together with the respective molds, whereby the filament portion in the semimolten state is stretched.

The adhering force of the molten material to the wall of the cavity 34 for forming the top end part 32 and both side faces 33 of the head portion 1 of the stopper device T is larger than the sum of the adhering force of the molten material to the wall of the cavity of the second mold 53 for forming the end face 28 of the head portion 1 on the side of the filament 3 and the adhering force of the molten material to the wall of the cavity 29 of the second mold 53 for forming the filament portion 3. Furthermore, the third mold 55 is instantaneously moved at a high speed in the lateral direction. Accordingly, a vacuum state is established between the wall of the cavity of the third mold 55 and the head portion 1, and therefore, by moving the head portion 1 of the stopper device T as mentioned above, the end face 28 of the head portion 1 on the side of the filament portion 3 and the filament portion 3 can be stretched while parting them from the cavity walls.

Then, the third mold 55, which is moved to the left in FIG. 9 in the state gripping the top end part 32 and both side faces 33 of the head portion so as to stretch the filament portion 3, then undergoes the action of the compression coil spring 14 and the slide plates 72 and 73 are going to slide on the stretching cam 80. However, since at this point the slide plate 73 of the third upper mold 35 is disengaged from the stretching cam 80, the slide plate 73 is stopped at this position. Thus, only the slide plate 72 of the moving plate 56 is further moved to the left on the stretching cam 80, and therefore, the stop plate 60 is allowed to slide on the inclined face 65 in the third upper mold 54 and third lower mold 35 and shift upwardly as shown in FIG. 10, whereby the third upper mold 54 is released from the engagement with the third lower mold 35.

When the slide plate 72 further slides on the stretching cam 80, the third upper mold 54 is moved together with the moving plate 56 to the left beyond the third lower mold in FIG. 10. As a result, the top end part 32 of the head portion 1 of the article stopper T and the upper halves in FIG. 10 of both side faces 33 of the head portion 1 are parted from the molds assuredly.

When the foregoing operations have been completed, as shown in FIG. 7, the stopper 13 of the fixed mold supporting plate 11 falls in bearing contact with the guide 12 attached to the fixed mold attaching plate 10 and the fixed mold supporting plate 11 is stopped at this position.

Figure 11:
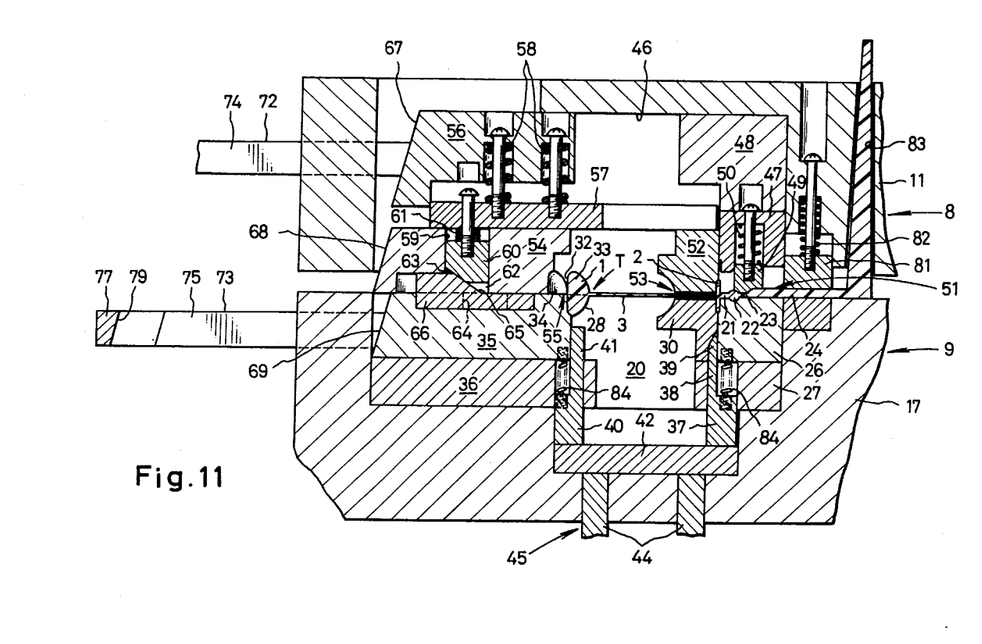

However, since the moving mold 9 further separates from the fixed mold 8, as shown in FIG. 11, the mold hanging plate 57 is separated from the moving plate 56 and fixed plate 48 by the urging force of the springs 58, and the second upper mold 52 and third upper mold 54 are held in the state where they are closely contacted with the second lower mold 30 and third lower mold 35 in the staggered state. Simultaneously, the first pressing plate 49 in the first upper mold 47 and the block 81 are held in the state closely adhering to the top faces of the first lower mold 26 and the moving mold supporting plate 17 by the springs 50 and 82, respectively.

However, since the first upper mold 47 is not moved but is left at the original position together with the fixed mold 8, as shown in FIG. 11, of the stopper device T adhering to the wall of the cavity 25 of the first upper mold 47, the upper right portion of the lateral rod 2, the connecting piece 21, the upper left portion of the connecting rod 22 and a part of the melt path 24 are parted from the mold while both ends thereof are being pressed, though the upper right portion of the connecting rod 22 adhering to the first pressing plate 49, the melt opening 23 and a part of the melt path 24 are kept in the unparted state.

Simultaneously, the melt path portion filled and molded in the melt path cavity 83 is parted by the pressing force of the block 81.

When the stopper device or tag pin T is parted from the mold to the above-mentioned extent, the portion adhering to the mold parts of the moving part 9 is larger than the portion of the mold parts of the fixed mold 8, and therefore, the adhering force of the portion adhering to the moving mold 9 is naturally larger than the adhering force of the portion adhering to the fixed mold 8.

Accordingly, when the moving mold 9 is further moved, the left upper portion of the crossbar or rod 2 adhering to the first upper mold 47 and the upper right portion of the connecting rod 22 and parts of the melt opening 23 and melt path 24 adhering to the first pressing mold 49 and a part of the melt path 24 adhering to the block 81 are respectively parted, and as a result, the molded stopper product T is entirely left on the moving mold 9 assuredly.

The stopper product T left on the moving mold 9 arrives at the final end of the return process of the moving mold 9 and the push-up plate shown in FIG. 7 is pushed by the push-out rod of the injection molding machine (not shown).

Accordingly, the push-up connecting plate 44 is pushed by the push-up plate 43, and in turn, the push-up members 37 and 40 are pushed up by the push-up connecting plate 44 through the push-up member bottom plate 42.

Figures 12, 13:
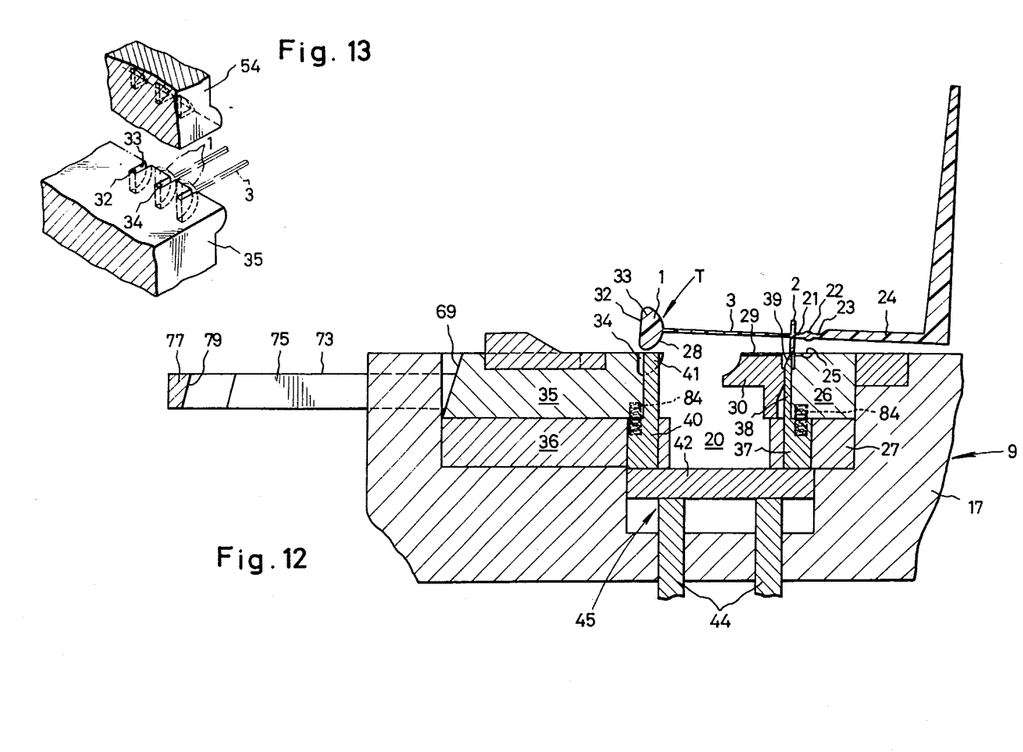
FIG. 13 is a partial perspective view illustrating the state of adherence of the head portion to the mold on stretching of the filament portion.

As a result, as shown in FIG. 12, by the action of the inclined portion 39 of the top end 38 of the push-up member 37, the second lower mold 30 is shifted to the left to separate the crossbar or lateral rod 2 therefrom. Simultaneously, the top end 38 of the push-up member 37 is projected in the cavity 29 of the lateral rod 2 to part the rod 2 from the first lower mold 26, and at the same time, the push-up member 40 on the left side in FIG. 12 presses the head portion 1 to part it from the third lower mold 35.

As is seen from the foregoing description, parting of stopper device T from the molds by the push-up members 37 and 40 can be accomplished by very small forces and therefore, the stopper T is not damaged by this parting operation and formation of flashes on the device T by the push-up members 37 and 40 is not caused at all.

In order to restore the original molding state in the respective molds as shown in FIG. 8 after completion of the parting of the product stopper T, the moving mold attaching portion of the injection molding maching (not shown) is advanced to the fixed mold attaching portion to separate the push-up plate 43 from the push-out rod (not shown), and therefore, the push-up members 37 and 40, push-up connecting plate 44 and push-up plate 43 are restored to the original positions by the actions of the springs 84 of the push-up members 37 and 40. As a result, the second lower mold 30 is returned to the original position by the action of the spring 31.

When the moving mold 9 is thus caused to fall in bearing contact with the fixed mold 8, the state as shown in FIG. 11 is attained.

If the moving mold 9 is further advanced, the spring 58 pressing the mold hanging plate 57, the spring 50 pressing the first pressing mold 49 and the spring 82 pressing the block 81 are contracted, and the respective molds are arranged in the state shown in FIG. 10.

At this point, the compression coil spring 14 begins contraction, and therefore, the stretching cam 80 falls again in engagement with the slide plate 72 and the moving plate 56 and third upper mold 54 are moved to the right in FIG. 10, whereby the state shown in FIG. 9 is restored.

As a result, the inclined faces 67, 68 and 69 of the moving plate 56 and third upper and lower molds 54 and 35 are located on the same plane, and the inclined face of the return cam 70 falls in bearing contact with the inclined face of the moving plate 56.

When the third upper mold 54 is registered with the third lower mold 35, the stop plate 60 slips down on the inclined face 65 of the stop plate cam 66 and falls in engagement with the interior of the anchoring groove 64 to integrate the third upper and lower molds 54 and 35 with each other.

When the moving mold 9 is further advanced, the stretching cam 80 falls also in engagement with the slide plate 73 of the third lower mold 35, and the return cam 70 shifts the inclined faces 67, 68 and 69 of the third upper and lower molds 54 and 35 to the left. As a result, the respective molds are returned to the original molding state shown in FIG. 8.

As will be apparent from the foregoing illustration, according to the present invention a sequence of steps of molding, stretching, parting of the molded article stopper device from the molds and returning of the molds of the original molding state can be performed by utilizing the mold attaching and separating operation of the injection molding machine, whereby a power source such as a cylinder or motor need not be disposed for moving the molds.

Further, in the present invention, since direct contact of the push-out pin with the head portion as observed in the conventional apparatus for manufacturing stopper devices or tag pins is prevented, formation of flashes on the head portion or deformation of the head portion can be prevented. Accordingly, in the present invention, it is possible to produce beautiful stopper or attachment devices not damaging fibers of garments or the like.

Furthermore, in the present invention, since a part of the molded stopper device is parted from the mold simultaneously with stretching of the filament portion and the remaining parts of the stopper device are parted from the mold independently and gradually, the parting property of the molded article stopper can be remarkably improved and this improvement can be enhanced by the fact that the stopper device is contracted with setting and hardening of the molded stopper device.

Still further, although in stopper devices according to the conventional technique the thickness of the head portion is influenced by the diameter of the push-out pin, such push-out pin is not used in the present invention, therefore the thickness of the head portion can optionally be adjusted in the present invention, and especially, it is possible to reduce the thickness of the head portion remarkably as compared with the device according to the conventional technique.

The life of the mold is greatly influenced by the space between the push-out pin and the mold. For example, when this space is about 2/100 mm, small flashes are formed and when the space is larger than 5/100 mm, large flashes are formed. Further, since an excessive force is generated in case of a thin push-out pin, the push-out pin is readily broken, bent or cracked and the life of the mold is drastically shortened. Still in addition, since such push-out pins must be used in a very large number, maintenance or inspection of the mold is very difficult.

In the present invention, however, such defects are not caused at all.

Moreover, in the conventional apparatus for producing stopper or attachment devices, the filament portion is stretched and laterally moved in the state where the head portion is surrounded by the mold, whereby it is difficult to enhance the stretching speed, and the productivity cannot be improved.

In contrast, according to the present invention, as is illustrated in the foregoing embodiment, while the end face of the head portion on the side of the filament portion is exposed, the remaining portion is laterally moved in the state adhering to the mold, and therefore, the mold movement can be simplified and the mold can be moved in a very simple manner. Accordingly, various advantages such as enhancement of the productivity can be attained, and the present invention makes great contribution to the art.

What is claimed is:

1. A method of stretching and releasing from a mold an integrally molded, thermoplastic resin stopper device said stopper device having a filament portion, a head portion on one end of said filament portion and a crossbar portion on the other end of said filament portion wherein said head portion has an end part, side faces and an end face, said mold including a first mold means surrounding said crossbar portion of said stopper device, a second mold means surrounding said filament portion and end face of said head portion of said stopper device, and a third mold means surrounding the side faces and end part of said head portion, said third mold means having separable upper and lower mold portions, said upper and lower portions being separable in a plane which includes the axis of said filament, said method of stretching and releasing said stopper device from said mold comprising:

(a) separating said second and third mold means by moving at least one of said second and third mold means away from the other in a direction along the axis of said filament portion of said stopper device, said side faces and end part of said head being adhered to said third mold means wherein said filament is stretched in its axial direction;

(b) stopping movement of one of said upper and lower portions of said third mold means and continuing the movement of the other of said upper and lower portions of the third mold means, thereby separating the side faces and end part of the head portion from the one of said upper and lower portions of the third mold means; and (c) separating said stopper device from the other of said upper and lower portions of said third mold means, and from said first and second mold means thereby releasing said stopper device from said mold.

2. The method of claim 1 wherein said first and second mold means each have upper and lower portions and wherein separating said stopper device from said first and second mold means includes separating said upper and lower portions and then separating said stopper device therefrom.

3. The method of claim 1 wherein said mold includes push up members and wherein separating said stopper device from said first and second mold means includes subsequent to separating said upper and lower portions of said front and second mold means, moving said push up members into contact with said head portion and crossbar portion of said stopper device to thereby separate said stopper device from said first, second and third mold means.

* * * * *